US011225299B2

(12) United States Patent
Carroll

(10) Patent No.: US 11,225,299 B2
(45) Date of Patent: Jan. 18, 2022

(54) LIGHT ASSEMBLY

(71) Applicant: NITERIDER TECHNICAL LIGHTING & VIDEO SYSTEMS, INC., Poway, CA (US)

(72) Inventor: Thomas Edward Carroll, Poway, CA (US)

(73) Assignee: NITERIDER TECHNICAL LIGHTING & VIDEO SYSTEMS, INC., Poway, CA (US)

(*) Notice: Subject to any disclaimer, the term of this patent is extended or adjusted under 35 U.S.C. 154(b) by 0 days.

(21) Appl. No.: 16/919,715

(22) Filed: Jul. 2, 2020

(65) Prior Publication Data

US 2021/0031854 A1 Feb. 4, 2021

Related U.S. Application Data

(60) Provisional application No. 62/881,234, filed on Jul. 31, 2019.

(51) Int. Cl.
*B62J 6/04* (2020.01)
*F21S 43/31* (2018.01)
(Continued)

(52) U.S. Cl.
CPC .............. *B62J 6/04* (2013.01); *B62J 6/015* (2020.02); *F21S 43/14* (2018.01); *F21S 43/195* (2018.01); *F21S 43/20* (2018.01); *F21S 43/31* (2018.01); *F21V 7/06* (2013.01); *F21V 21/0816* (2013.01); *B60Q 1/0058* (2013.01); *B60Q 3/35* (2017.02);
(Continued)

(58) Field of Classification Search
CPC ............. F21V 23/0414; F21V 23/0421; F21V 23/0428; F21V 7/0008; F21V 7/0016; F21V 7/0025; F21V 7/0033; F21V 7/0041; F21S 9/00; F21S 9/02; F21S 9/022; B60Q 3/35; B60Q 3/59; B60Q 7/00; B60Q 1/0058; B62J 6/015; B62J 6/028; B62J 6/029; B62J 6/04; B62J 6/045; B62J 6/05; B62J 6/054; F21Y 2107/50; F21L 4/00; F21L 4/005; F21L 4/02; F21L 4/022; F21L 4/027
See application file for complete search history.

(56) References Cited

U.S. PATENT DOCUMENTS 6,414,801 B1 * 7/2002 Roller ................... F21S 43/40
359/726
8,845,153 B2 9/2014 Lee
(Continued)

FOREIGN PATENT DOCUMENTS

EP           890503 A1    7/1997
KR       101032885 B1    7/2010
LU       204554614 U     2/2015

*Primary Examiner* — Alexander K Garlen
*Assistant Examiner* — Colin J Cattanach
(74) *Attorney, Agent, or Firm* — David Duckworth

(57) ABSTRACT

An improved light assembly includes aligned directional light sources mounted one behind another. A distal one of the light sources occludes light emitted from a proximal one of the light sources. A reflector is interposed between the light sources, with a convex surface facing the proximal one of the light sources. Thus, the light assembly projects a light field extending at least through an 180° hemisphere, and up to about 270° backwards from the forward orientation of the light field, well-illuminating lateral approaches to the assembly.

19 Claims, 5 Drawing Sheets

(51) Int. Cl.
<table>
<tr><td>F21S 43/20</td><td>(2018.01)</td></tr>
<tr><td>F21S 43/14</td><td>(2018.01)</td></tr>
<tr><td>F21V 7/06</td><td>(2006.01)</td></tr>
<tr><td>F21V 21/08</td><td>(2006.01)</td></tr>
<tr><td>B62J 6/015</td><td>(2020.01)</td></tr>
<tr><td>F21S 43/19</td><td>(2018.01)</td></tr>
<tr><td>F21W 107/13</td><td>(2018.01)</td></tr>
<tr><td>F21Y 115/10</td><td>(2016.01)</td></tr>
<tr><td>F21Y 103/10</td><td>(2016.01)</td></tr>
<tr><td>B62J 6/029</td><td>(2020.01)</td></tr>
<tr><td>B60Q 7/00</td><td>(2006.01)</td></tr>
<tr><td>F21V 7/00</td><td>(2006.01)</td></tr>
<tr><td>F21S 9/00</td><td>(2006.01)</td></tr>
<tr><td>B60Q 1/00</td><td>(2006.01)</td></tr>
<tr><td>F21L 4/02</td><td>(2006.01)</td></tr>
<tr><td>B60Q 3/59</td><td>(2017.01)</td></tr>
<tr><td>F21Y 107/50</td><td>(2016.01)</td></tr>
<tr><td>F21S 9/02</td><td>(2006.01)</td></tr>
<tr><td>F21L 4/00</td><td>(2006.01)</td></tr>
<tr><td>B62J 6/028</td><td>(2020.01)</td></tr>
<tr><td>B60Q 3/35</td><td>(2017.01)</td></tr>
<tr><td>B62J 6/05</td><td>(2020.01)</td></tr>
<tr><td>B62J 6/054</td><td>(2020.01)</td></tr>
<tr><td>B62J 6/045</td><td>(2020.01)</td></tr>
<tr><td>F21Y 107/60</td><td>(2016.01)</td></tr>
</table>

(52) U.S. Cl.
CPC .................. *B60Q 3/59* (2017.02); *B60Q 7/00* (2013.01); *B62J 6/028* (2020.02); *B62J 6/029* (2020.02); *B62J 6/045* (2020.02); *B62J 6/05* (2020.02); *B62J 6/054* (2020.02); *F21L 4/00* (2013.01); *F21L 4/005* (2013.01); *F21L 4/02* (2013.01); *F21L 4/022* (2013.01); *F21L 4/027* (2013.01); *F21S 9/00* (2013.01); *F21S 9/02* (2013.01); *F21S 9/022* (2013.01); *F21V 7/0008* (2013.01); *F21V 7/0016* (2013.01); *F21V 7/0025* (2013.01); *F21V 7/0033* (2013.01); *F21V 7/0041* (2013.01); *F21W 2107/13* (2018.01); *F21Y 2103/10* (2016.08); *F21Y 2107/50* (2016.08); *F21Y 2107/60* (2016.08); *F21Y 2115/10* (2016.08)

(56) References Cited

U.S. PATENT DOCUMENTS

| | | | |
|---|---|---|---|
| 9,080,737 B2 | 7/2015 | Monma et al. | |
| 9,648,673 B2* | 5/2017 | Pickard | H05B 45/00 |
| 9,784,434 B2* | 10/2017 | Watanabe | F21V 7/06 |
| 2008/0049438 A1* | 2/2008 | Bloemen | F21S 43/14 |
| | | | 362/540 |
| 2013/0039090 A1* | 2/2013 | Dau | F21V 7/0025 |
| | | | 362/551 |
| 2013/0114254 A1* | 5/2013 | Nakamura | G02B 19/0028 |
| | | | 362/235 |
| 2015/0260365 A1* | 9/2015 | Kitayama | F21S 43/19 |
| | | | 362/519 |
| 2016/0061394 A1* | 3/2016 | Yeo | F21V 29/74 |
| | | | 362/294 |
| 2017/0089537 A1* | 3/2017 | Tsuchiya | F21S 41/285 |
| 2017/0365136 A1* | 12/2017 | Torre Sarmiento | F21S 9/022 |
| 2018/0111654 A1* | 4/2018 | Emerson | F21V 23/004 |

* cited by examiner

LIGHT ASSEMBLY

PRIORITY CLAIM

The present application claims priority to U.S. Provisional Patent Application Ser. No. 62/881,234 filed Jul. 31, 2019, which is incorporated herein in its entirety by reference.

BACKGROUND

The present application relates to light assemblies, and more particularly to a flashlight or bicycle light. Light assemblies, also referred herein simply as lights, typically include a light source such as an incandescent bulb and/or a light emitting diode (LED). A light assembly also includes a power source such as a battery, and a switching assembly such as an on/off switch. Typical light assemblies include portable battery-operated flashlights which are used extensively in society. These lights can be carried by hand or mounted to an object, for example, to a helmet to provide a helmet light or to a bicycle to provide a bicycle light. Alternatively, light assemblies can be attached to the outside of clothing and upon backpacks worn by humans or dogs, horses or other animals.

Current bicycle lights suffer from significant drawbacks. For example, flashlights typically provide either a narrow beam, a wide beam, or the capability of switching from one to another. However, current light assemblies do not provide both a narrow forward-facing beam and a wide forward-facing beam at the same time. Furthermore, current bicycle lights emit light in one direction, for example in a beam aligned along an axis with a spread not greater than 180 degrees from the source, i.e., 90 degrees from the central axis of light transmission. It may therefore be difficult for off-axis observers to notice the light if it is not aimed towards them, and more so when viewing conditions are obscured by poor weather or the like. Poor off-axis visibility of prior lights may increase hazards for bicyclists and pedestrians when crossing road intersections, for example.

It would be desirable, therefore, to develop new methods and other new technologies for a light assembly, that overcomes these and other limitations of the prior art. For example, by providing a new light assembly that emits an increased amount of light in off-axis directions to provide greater visibility of the light bearer for motorists and others, while retaining the functionality of a beam illuminating in an intended primary direction.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, an improved light assembly may include at least two aligned directional light sources mounted one behind another, wherein a distal one of the light sources occludes light emitted from a proximal one of the light sources, and a reflector interposed between the light sources, having a convex surface facing the proximal one of the light sources. In an aspect, each of the light sources may be, or may include at least one Light-Emitting Device (LED) mounted to a planar substrate. For example, the planar substrate may be elongate and opaque, and the at least one LED may include a plurality of LEDs arranged along the elongate substrate.

In an aspect, the convex surface of the reflector may be cylindrically arcuate, for example, parabolic. In another aspect, the light sources may be mounted in substantially parallel disparate planes.

The apparatus may further include a base supporting the proximal one of the light sources, and an outer light-transmissive housing coupled to the base, enclosing the light sources and the reflector. As used herein, "light-transmissive" means transparent or translucent. In addition, the apparatus may further include an inner light-transmissive housing inside the outer light-transmissive housing, wherein the inner light-transmissive housing does not enclose the distal one of the light sources. The inner light-transmissive housing may support the distal one of the light sources.

The apparatus may further include a circuit board having at least one semiconductor device operatively coupled to the light sources. The proximal one of the light sources may be mounted to the circuit board. Likewise, the apparatus may include a second circuit board to which the distal one of the light sources may be mounted.

The apparatus may further include a battery compartment disposed under the proximal one of the light sources. A strap may be fixed to the battery compartment for attaching the light assembly to an object, for example, a bicycle or other vehicle.

In an aspect, the reflector may be configured to reflect light from the proximal one of the light sources at least 90 degrees away from a primary emission direction of the light sources. For example, the reflector may be configured to reflect light from the proximal one of the light sources in a range of 90 degrees to 135 degrees away from a primary emission direction of the light sources. Thus, the light assembly can emit light over a broader angle than prior assemblies, such as a spherical section greater than 180 degrees. In some embodiments the light assembly may emit light over a substantially greater spherical section than 180 degrees, such as a section of 260 degrees or more.

In related aspects, a method for illuminating a conveyance may include attaching a light assembly having elements as described above to the conveyance, oriented with the light sources facing backwards relative to the conveyance, such that the distal light shines backwards without being reflected and the light from the proximal light source is reflected by the reflector forward. In an aspect, the conveyance may be a bicycle, and the attaching may include strapping the light assembly behind the bicycle seat. Thus the light assembly can illuminate in backwards and lateral directions, including lateral directions oriented towards the front of the conveyance, so traffic moving laterally (e.g., in a perpendicular direction) relative to the conveyance receive light from the assembly and are thereby alerted to the conveyance's presence and motion.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

DETAILED DESCRIPTION

Figures 1, 2:
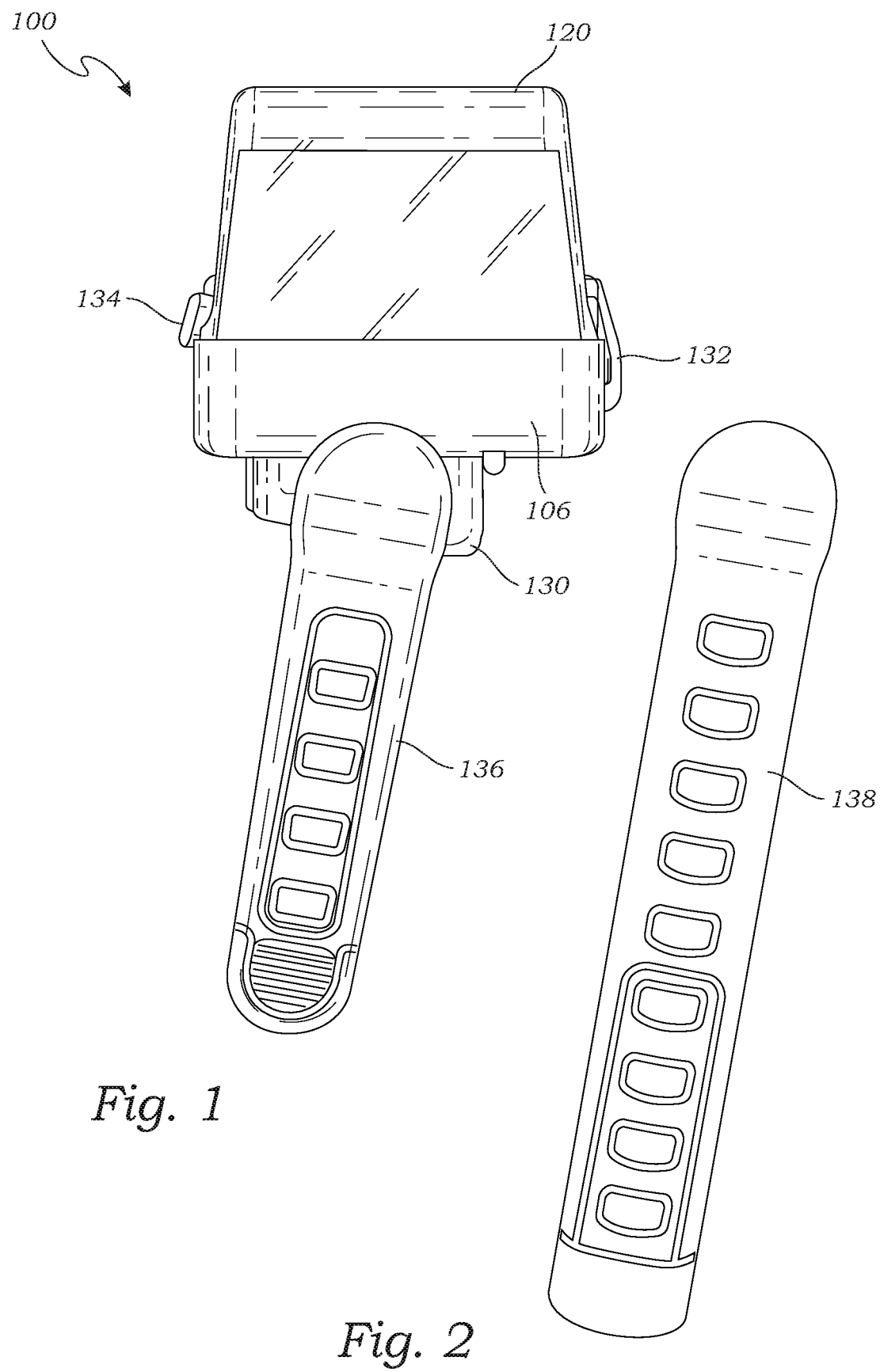
FIG. 1 is a top view of a novel light assembly.
FIG. 2 illustrates a strap for attaching the light assembly shown in FIG. 1 to a bicycle or other structure.
Figure 3:
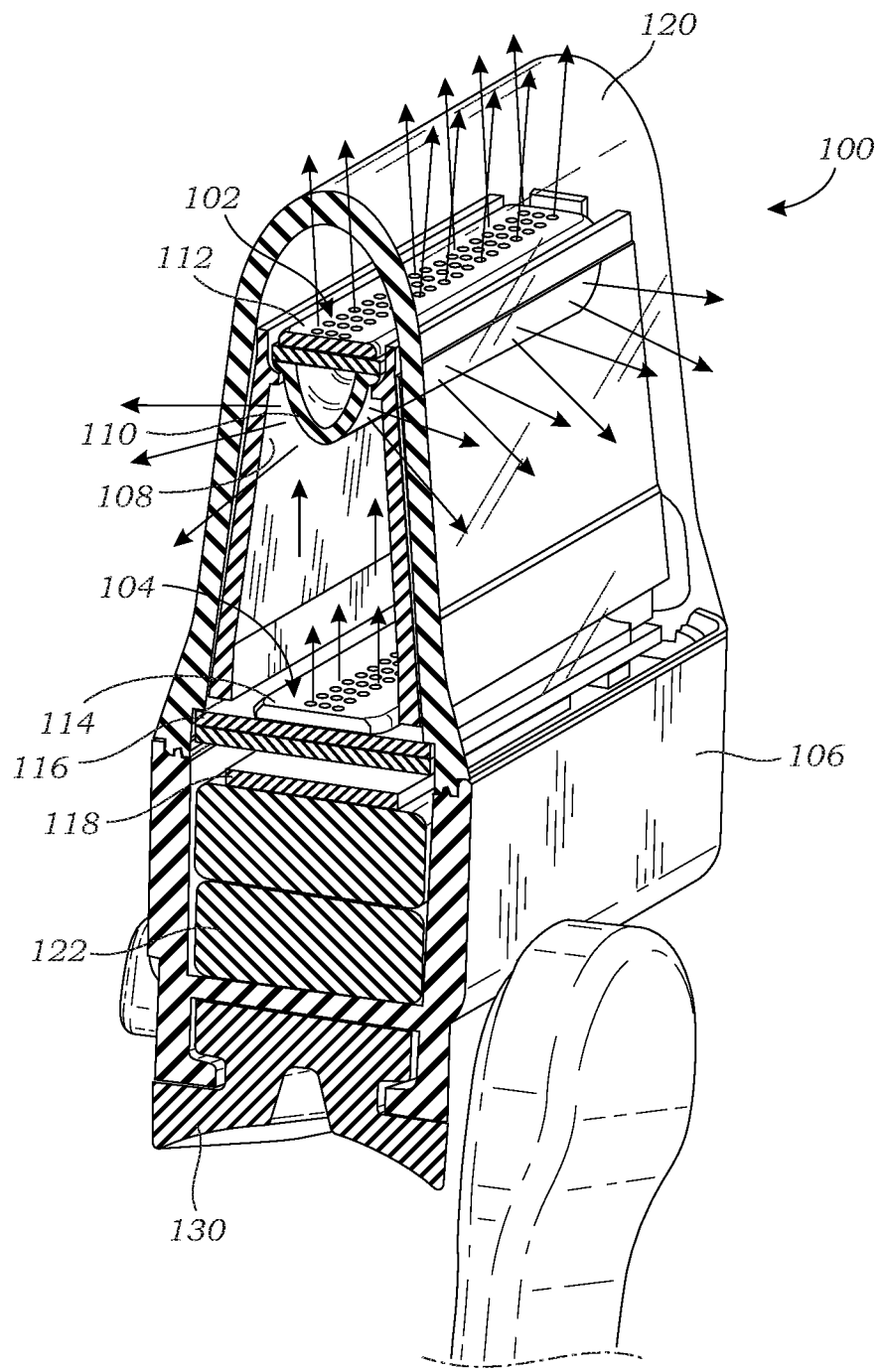
FIG. 3 is a cutaway perspective view of the light assembly shown in FIG. 1.
Figure 4:
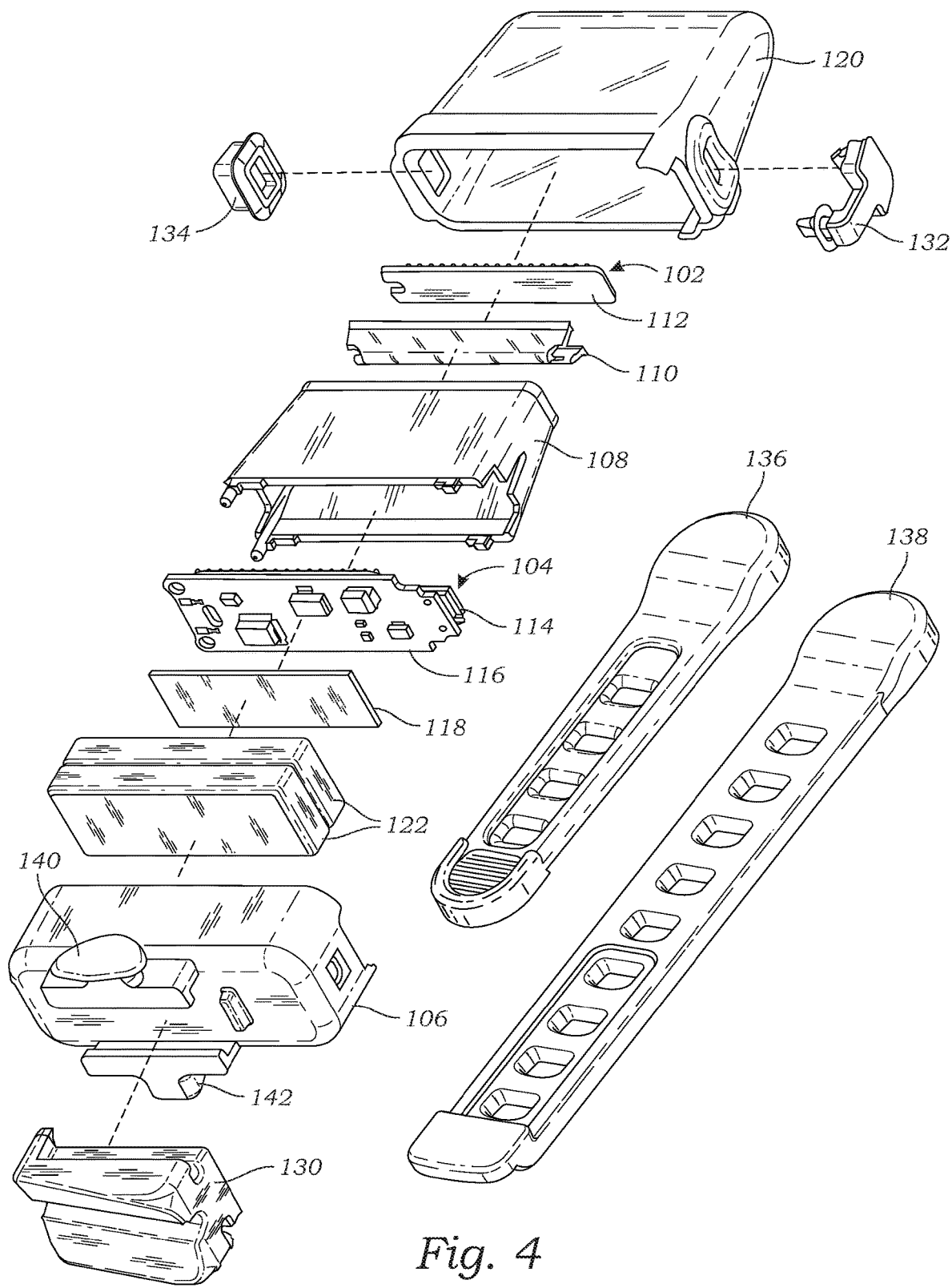
FIG. 4 is an exploded perspective view of the light assembly shown in FIG. 1.

Various aspects are now described with reference to the drawings. In the following description, for purposes of explanation, numerous specific details are set forth to provide a thorough understanding of one or more aspects. It may be evident, however, that the various aspects may be practiced without these specific details. In other instances, well-known structures and devices are shown in block diagram form to facilitate describing these aspects.

Referring to FIGS. 1-4, a portable apparatus 100 for emitting light in multiple directions includes at least two separate light sources 102, 104. In the illustrated embodiment, the at least two light sources 102, 104 are instantiated as Light-Emitting Diode (LED) arrays on elongate rectangular substrates 112, 114. The substrates 112, 114 may be, or may include, a printed circuit board (PCB) material configured for supplying power to an LED array mounted to it. In an aspect, the substrate material may be opaque. In other embodiments, the substrates 112, 114 are not rectangular and/or are not elongated. The LED arrays of the light sources 102, 104 may include any non-zero integer number of LEDs. In alternative embodiments, or in addition, the light sources 102, 104 may be or may include another type of emissive element that can be powered by a battery, for example a filament bulb or fluorescent tube.

A distal one of the light sources 102 is coupled to a base 106 of the apparatus 100 by a light-transmissive support collar 108, that holds the light source 102 and associated substrate 112 substantially parallel (e.g., within five degrees of parallel) to the proximal light source 104 and associated substrate 114. The collar 108 attaches the distal light source to the base 106 without obstructing light from a proximal one of the light sources 104 mounted to the base 106 inside the collar 108. The collar 108 may be made from any suitable light-transmissive structural plastic, for example by injection molding, or from any other suitable light-transmissive material or composite. The assembly of the collar 108 to the substrate 112 and base 106 encloses the proximal light source 104 and other components, with a small opening to allow for electrical wiring (not shown) to pass though. The distal light source 102 may be attached to the base 106 using any suitable structure that transmits light from the proximal light source 104 and reflector 110 to the exterior of the assembly 100. In the preferred embodiment, the collar is made of a red translucent and diffusive plastic so that light emitted from light sources 104 appears red. In other embodiments, the collar 108 may include large openings to better transmit light.

The collar 108 may further support the convex (e.g., parabolic) reflector 110 positioned under the distal substrate 112, having an arcuate convex surface facing the proximal light source 104. In alternative embodiments, the surface of the reflector facing the light source 104 may be non-arcuate, for example, V-shaped, or multi-faceted. However, a smooth arcuate convex reflector may be advantageous for spreading light from the source 104 over a broad cylindrical or spherical section more evenly and with less glare than from a flat or multi-faceted reflector. The reflector 110 may be made from any suitable reflective material, for example, polished metal, chrome-plated metal, metallized plastic, or metallized glass. While the illustrated reflector 110 is semi-cylindrical, the reflector may have any other suitable configuration, for example hemi-spherical. FIGS. 1-4 are drawn to scale and may be used as references for useful geometry.

The proximal light source 104 and substrate 114 may be coupled to an PCB 116 (FIG. 3) including a semiconductor circuit for controlling the light sources 102, 104. Depending on design preferences, control functions may include, for example, on, off, set power or intensity, emission of different colors of light, pulsing or blinking, automatic on/off based on input from an ambient light sensor or motion sensor, or any other useful function. Electrical wires, alone or in a wiring harness (not shown) may connect the circuit on the PCB 116 to the distal light source 102, the batteries 122, and to the proximal light source 104. The circuit on the PCB 116 controls both the distal light source 102 and the proximal light source 104.

The light sources 102, 104, collar 108, reflector 110 and associated components may be enclosed in a light transmissive cover 120 made of a structural plastic, or other suitable material, attached to the base 106. In the preferred embodiment, the light transmissive cover 120 is made of a substantially clear transparent plastic. The base 106 may include an interior compartment holding one or more batteries 122 for powering the circuit on the PCB 116 and light sources 102, 104. A spacer of insulating material 118 may be interposed between the batteries 122 and the PCB 116.

Figure 5:
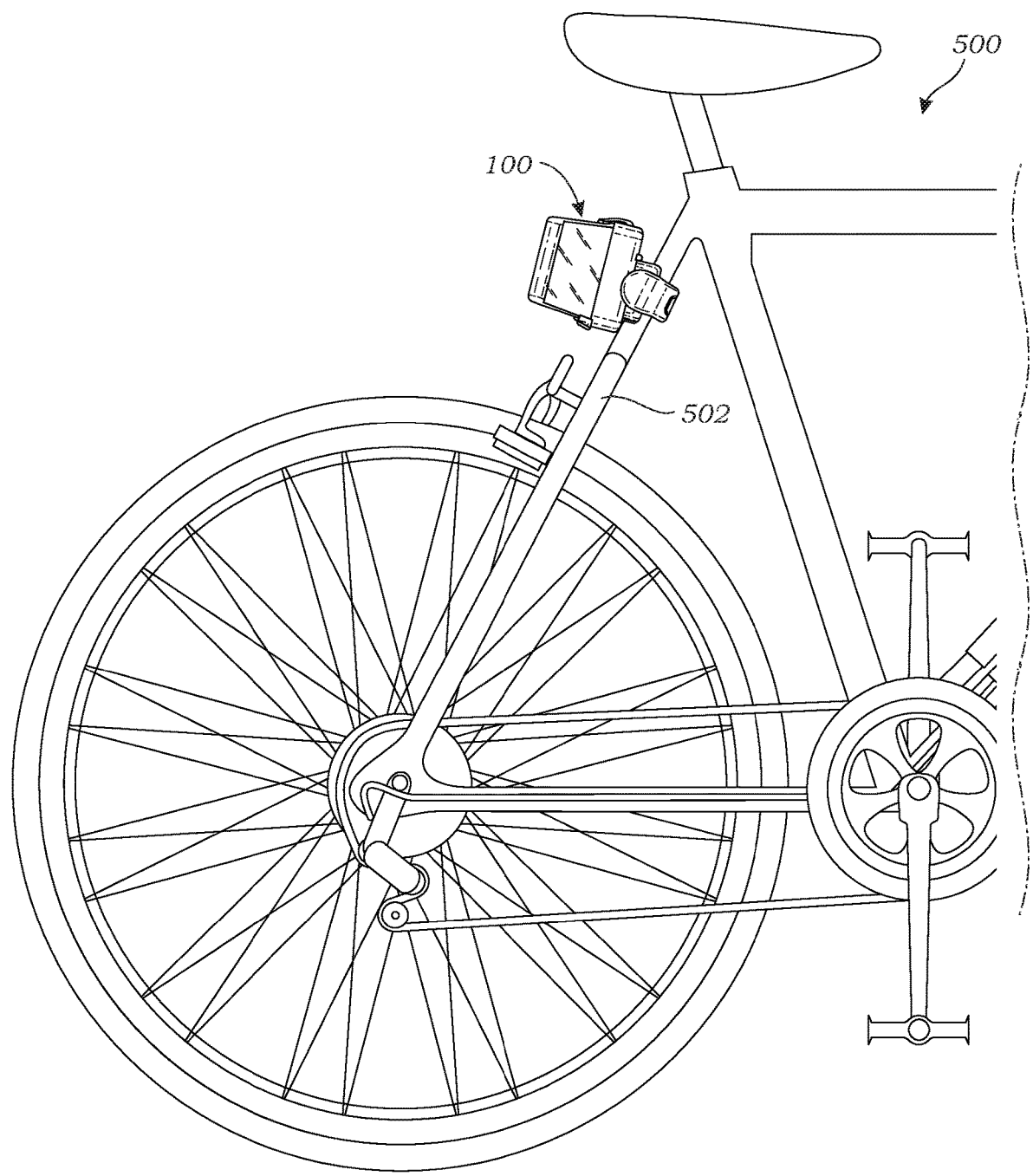
FIG. 5 is a side view of the light assembly attached by its strap assembly to a bicycle.

A mounting adaptor 130 may be attached to the base 106 to facilitate attachment of the light assembly 100 to a frame 502 of a bicycle 500 or similar conveyance (FIG. 5). Straps 136, 138 may snap to posts 140, 142 on the base 106. Elongate portions of the straps 136, 136 may be configured to wrap around a frame or similar element and may include elements for attaching to one another, for example, buckles and straps, sockets and posts, hook-and-loop materials, or any other suitable attachment mechanism. The base 106 may be attached to the cover 120 using removable elements, for example using fastening components 132 and 134. In the use case illustrated by FIG. 5, the light assembly is attached to the rear of the conveyance and facing backwards. In this use case, light projects backwards and forwards from the rear of the bicycle. Thus, FIG. 5 illustrates a method for illuminating a conveyance by attaching a light assembly as described to the conveyance, oriented with the light sources facing backwards relative to the conveyance, such that the distal light shines backwards without being reflected and the light from the proximal light source is reflected by the reflector forward. In other use cases and methods, the light assembly may be attached to the front of the bicycle, in an orientation reversed from that shown in FIG. 5.

Figure 6:
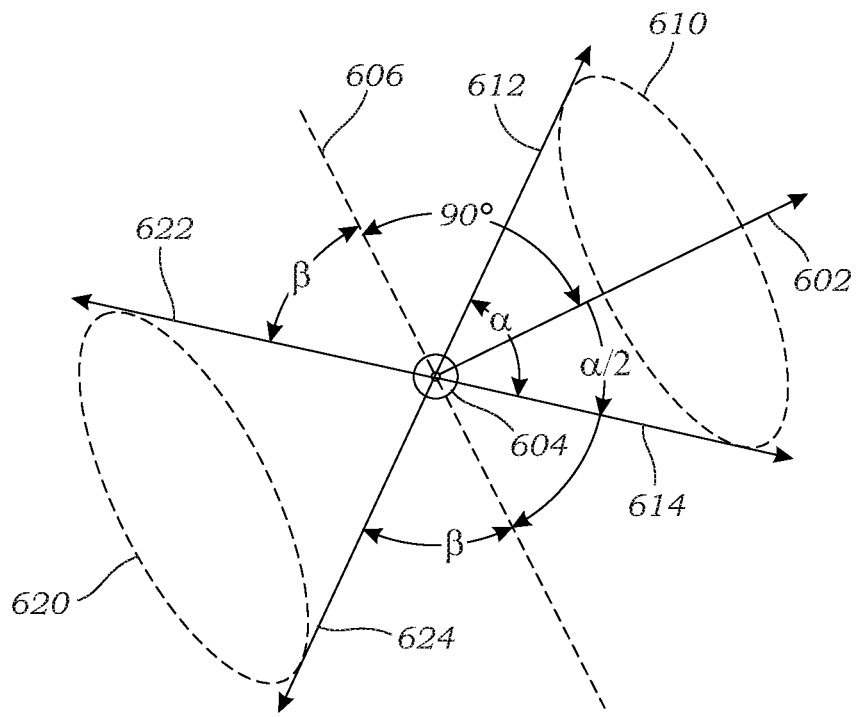
FIG. 6 is a diagram showing geometrical features of light fields emitted from the light apparatus.

FIG. 6 illustrates an example of a light field 600 projected from the illustrated light assembly. It should be appreciated that the specific geometry of the light field may be adapted by altering the shape, position, and orientation of the light sources 102, 104 and reflector 110. The circle 604 represents the light assembly, wherein the distal light source projects a cone-shaped light field 610 centered around a central ray 602 indicating a primary emission direction of the light sources and assembly 604. The light cone 610 subtends an angle 'α' between the boundaries 612, 614 which is at least 90° and may be as great as 180°, extending to a midplane 606 perpendicular to the drawing page and parallel to the substrate of the distal light source, which being opaque, prevents light from the distal light source shining past the midplane 606.

The proximal light source reflected by the reflector supplies light to the space extending from the midplane 606 to the boundaries 622, 624 of the shadow cone 620, subtending an angle 'β'. Because the midplane 606 is perpendicular to the central ray 602, the reflector is configured to reflect light from the proximal one of the light sources at least 90° away from a primary emission direction of the light sources. In an aspect, the reflector is configured to reflect light from the proximal one of the light sources in a range of 90° to 135° away from a primary emission direction of the light sources, illustrated by 'β' in FIG. 6. The light assembly may be configured such that angle 'β' may be between 30° to 60° from the midplane. By way of example, an angle 'α' of 180° with an angle 'α' of 45° results in a 90° shadow cone and a 270° light field. For further example, an angle 'α' of 180° with an angle 'β' of 60° results in a 60° shadow cone and a 300° light field. In any case, the shadow cone 620 is preserved, to prevent casting light back onto the base of the light apparatus where it can do no good, or in a direction that may cause a problem such as glare to the operator of the conveyance.

Figure 7:
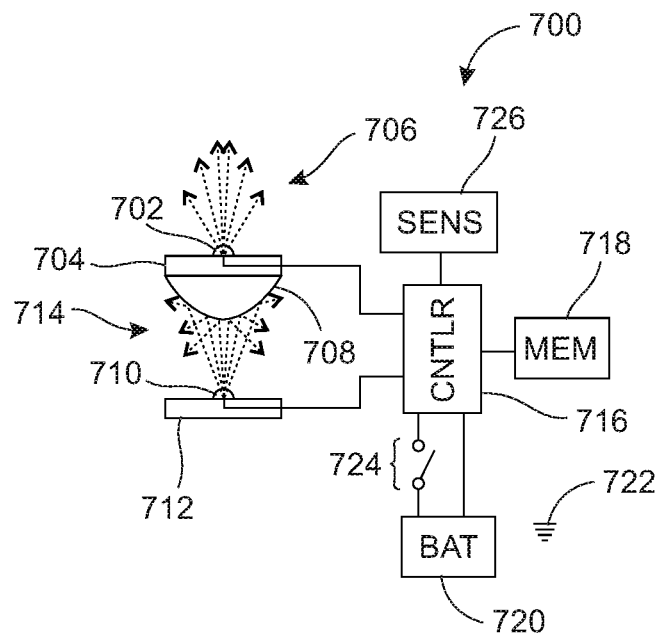
FIG. 7 is a diagram showing aspects of an electrical circuit and optical elements of the light assembly.

FIG. 7 illustrates aspects of an electrical circuit 700 powering light sources 702 and 710 emitting light rays 706 and 714, respectively. The rays 706 are emitted from the distal light source 702 on a substrate 704 as described above. The rays 714 are emitted from the proximal light source 710 on substrate 712 and reflected by the reflector 708 as described above.

The circuit 700 supplies power from a portable power source, for example a battery 720, to the light sources 702, 710 via a controller 716. The controller 716 may be a semiconductor device, for example a microcontroller, which may include or be coupled to a memory 718 holding instructions for controlling functions provided by the circuit 700 (PCB 116) as described herein above. In some embodiments, the controller 716 may be coupled to a sensor 726, for example an ambient light sensor or motion sensor, and use input from the sensor in a control method for the light sources 702, 710. The circuit may include a manual switch 724 enabling a user to activate or deactivate the circuit 700 as desired, and other components as known in the art of circuit design for light-emitting devices.

The previous description of the disclosed aspects is provided to enable any person skilled in the art to make or use the present disclosure. Various modifications to these aspects will be clear to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An apparatus for emitting light, comprising:
    at least two aligned directional light sources mounted one behind another and enclosed by an outer light-transmissive cover, wherein a distal one of the light sources occludes light emitted from a proximal one of the light sources; and
    a reflector interposed between the light sources and supported inside the outer light-transmissive cover by an inner light-transmissive collar that encloses the proximal one of the light sources and the reflector, wherein the reflector has a convex surface facing the proximal one of the light sources configured to reflect light from the proximal one of the light sources to an exterior of the light assembly in an opposing direction at least 90 degrees away from a primary emission direction of the light sources.

2. The apparatus of claim 1, wherein each of the light sources comprises at least one Light-Emitting Device (LED) mounted to a planar substrate.

3. The apparatus of claim 2, where the planar substrate is elongate and opaque.

4. The apparatus of claim 3, wherein the at least one LED comprises a plurality of LEDs arranged along the elongate substrate.

5. The apparatus of claim 1, where the convex surface of the reflector is cylindrically arcuate.

6. The apparatus of claim 1, where the convex surface of the reflector is parabolic.

7. The apparatus of claim 1, wherein the light sources are mounted in substantially parallel disparate planes.

8. The apparatus of claim 1, further comprising a base supporting the proximal one of the light sources.

9. The apparatus of claim 8, wherein the outer light-transmissive cover is coupled to the base and encloses the light sources and the reflector.

10. The apparatus of claim 9, wherein the inner light-transmissive collar does not enclose the distal one of the light sources.

11. The apparatus of claim 10, wherein the inner light-transmissive collar supports the distal one of the light sources.

12. The apparatus of claim 1, further comprising a circuit board comprising at least one semiconductor device operatively coupled to the light sources.

13. The apparatus of claim 12, wherein the proximal one of the light sources is mounted to the circuit board.

14. The apparatus of claim 13, wherein the distal one of the light sources is operatively coupled to the circuit board.

15. The apparatus of claim 1, further comprising a battery compartment disposed under the proximal one of the light sources.

16. The apparatus of claim 15, further comprising a strap fixed to the battery compartment.

17. The apparatus of claim 16, wherein the reflector is configured to reflect light from the proximal one of the light sources in a range of 90 degrees to 135 degrees away from a primary emission direction of the light sources.

18. A method for illuminating a conveyance, comprising:
    attaching a light assembly to the conveyance, comprising at least two aligned directional light sources mounted one behind another and enclosed by an outer light-transmissive cover, wherein a distal one of the light sources occludes light emitted from a proximal one of the light sources, and a reflector interposed between the light sources and supported inside the outer light-transmissive cover by an inner light-transmissive collar that encloses the proximal one of the light sources and the reflector, wherein the reflector has a convex surface facing the proximal one of the light sources configured to reflect light from the proximal one of the light sources to an exterior of the light assembly in an opposing direction at least 90 degrees away from a primary emission direction of the light sources, wherein the light assembly is oriented with the light sources facing backwards relative to the conveyance, such that the distal light shines backwards without being reflected and the light from the proximal light source is reflected by the reflector forward.

19. The method of claim 18, wherein the conveyance comprises a bicycle, and the attaching comprises strapping the light assembly behind the bicycle seat.

\* \* \* \* \*